Patented Feb. 27, 1951

2,543,187

UNITED STATES PATENT OFFICE 2,543,187

PHARMACEUTICAL INTERMEDIATES

Edmond E. Moore and Marjorie B. Moore, Waukegan, Ill., assignors to Abbott Laboratories, North Chicago, Ill., a corporation of Illinois No Drawing. Original application April 7, 1943, Serial No. 482,205. Divided and this application February 13, 1947, Serial No. 728,377

1 Claim. (Cl. 260—470)

This application is a division of our copending application, Ser. No. 482,205, filed April 7, 1943, now abandoned.

The present invention relates to products of interest in the therapeutic field and improved processes of preparing the same. More specifically, the present invention is directed to the synthesis of valuable intermediates having particular utility in the preparation of certain vitamins or vitamin-like substances.

The principal object of the present invention is to provide products for use in the preparation of therapeutically active compounds including compounds used in vitamin therapy.

Another object of the present invention is to provide improved processes of preparing products for use in the preparation of therapeutically active compounds.

Other objects of the present invention will be apparent from the detailed description hereinafter.

Included among the intermediates of the present invention are the di-lower alkyl esters of β-(carboxymethylthio) propionic acid. The diethyl ester derivative of the β-(carboxymethylthio) propionic acid may be represented by the following formula:

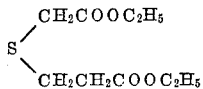

These products may be prepared by the following improved methods:

(a) By reacting thioglycollic acid with a lower alkyl acrylate in the presence of an organic base such as pyridine, removing the organic base and esterifying the free carboxyl group by use of the appropriate alcohol and acid. The following equations illustrate this preparation:

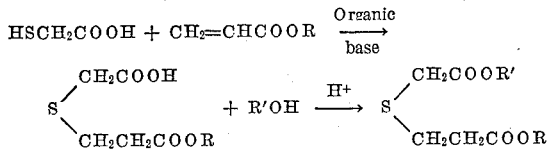

where the R and R' represent lower alkyl groups such as methyl, ethyl, propyl, butyl, etc. The esterification reaction may be carried out with the desired lower alcohol (R'OH) and for the catalyst (H+) one may use, for example, dry hydrogen chloride gas, concentrated sulfuric acid, benzene sulfonic acid, etc.

(b) By reacting thioglycollic acid with the nitrile of acrylic acid and converting the resulting β-(carboxymethylthio) propionitrile to the diester by heating with the appropriate alcohol and acid, hydrolyzing and esterifying mixture. The following equations illustrate this preparation:

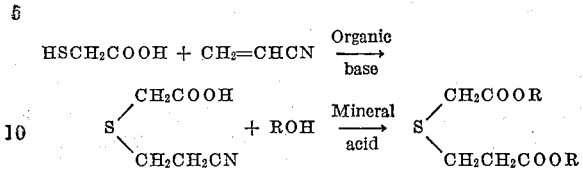

where R is a lower alkyl group.

(c) By reacting a lower alkyl ester of thioglycollic acid with, for example, the acrylonitrile as in (b) above. The resulting β-(carbalkoxymethylthio) propionitrile may also be converted into the desired diester by the general esterifying reactions above illustrated. In this case, as in (a) above, the alkyl (R and R') groups need not be the same.

The following examples will serve to illustrate the above processes of the present invention.

EXAMPLE 1 a. *Mono-ethyl ester of β-(carboxymethylthio) propionic acid*

A mixture made up of about 22 grams of thioglycollic acid, 45 grams of ethylacrylate and 0.5 gram of pyridine is first heated in a closed vessel at about 100° C. for about eight hours. The excess ethylacrylate along with the pyridine are next removed by distillation.

b. *Di-ethyl ester of β-(carbethoxymethylthio) propionic acid*

The crude half ester product obtained as in a above is converted into the diester by saturating an absolute alcohol solution of the half ester with hydrogen chloride gas. After the reaction is complete the acid is neutralized with alkali (e. g. NaOH) and the crude product purified by fractional distillation under reduced pressure. The desired product boils at about 136°–138° C. at 8 mm. pressure.

EXAMPLE 2 a. *β-(Carboxymethylthio) propionitrile*

About 21 grams of thioglycollic acid and about 24 grams of acrylonitrile mixed with about 0.5 gram of pyridine are first heated for about eight hours at 100° C. in a closed vessel. The excess acrylonitrile and pyridine are next removed by distillation in accordance with standard practices.

b. Di-ethyl ester of β-(carbethoxymethylthio) propionic acid

The crude product obtained as in a above is hydrolyzed and esterified as follows: A mixture made up of about 14.5 grams of β-(carboxymethylthio) propionitrile, 20 cc. of concentrated sulfuric acid and 47.6 cc. of ethyl alcohol (95%) is refluxed for about seven hours and allowed to stand over night. The reaction mixture is next diluted with about 10 cc. of ethyl alcohol to precipitate ammonium sulfate, the resulting solution concentrated to about 60 cc. and then poured in about 400 cc. of water. The aqueous mixture is next extracted with ether, the ether extract washed with a solution of sodium carbonate, then with water and finally dried over anhydrous sodium sulfate, in accordance with standard practices. The solvent is then recovered and the crude material distilled as in Example 1.

EXAMPLE 3

β-(Carbethoxymethylthio) propionitrile

A mixture made up of about 24 grams of ethyl thioglycolate, 21.5 grams of acrylonitrile and 0.5 gram of pyridine is heated at about 100° C. for about eight hours in a closed vessel. The excess acrylonitrile is recovered by distillation and the residue fractionally distilled. The desired product which boils at about 120°–125° C. at 3 mm. pressure, may be hydrolyzed and converted into the di-lower alkyl ester by use of the appropriate alcohol in accordance with the general process outlined in b of Example 2.

The intermediates of the present invention also include the diesters of derivatives of the above compounds where, for example, one of the hydrogen atoms on the alpha carbon atom of the propionic radical has been replaced by an amino group. The dimethyl ester derivative of this β-(carboxymethylthio) α-aminopropionic acid compound may be represented by the following formula:

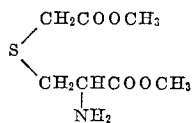

These products, which may be prepared by esterifying the free carboxyl groups as outlined above, react with acyl halide compounds such as benzoyl chloride to form intermediates of particular value in the synthesis of therapeutic products. The preparation of these intermediates may be illustrated by the following equations:

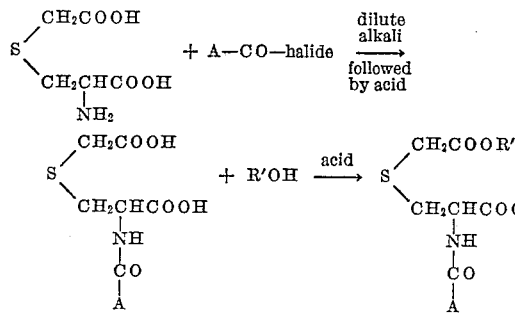

where R' is a lower alkyl group and A represents an aryl radical such as phenyl, naphthyl, etc., an alkyl radical such as propyl, butyl, etc. or an aralkyl radical such as benzyl, etc. In the preparation of these products as shown above β-(carboxymethylthio) α-aminopropionic acid is first reacted with the desired acid (A—CO) halide in the presence of alkali. After acidification the reaction mixture is extracted with a water immiscible solvent, the solvent removed by evaporation, the residue taken up in dry alcohol and esterified in the usual manner. The acidic esterification reaction mixture is next neutralized and the solvent alcohol and esters removed by distillation under reduced pressure at a temperature below that at which decomposition of the desired diester product takes place. The following example will serve to illustrate this process.

EXAMPLE 4

Ethyl ester of β-(carbethoxymethylthio) α-N-benzoylaminopropionic acid

To an aqueous solution containing about one mol of β-(carboxymethylthio) α-aminopropionic acid is added about five molar proportions of sodium hydroxide. The solution is next cooled and about 1.5 molar proportions of benzoyl chloride added with stirring, the stirring being continued until the odor of the acid chloride has disappeared. The reaction mixture is also warmed near the end of the reaction to assure its completion. About 5.5 molar proportions of concentrated hydrochloric acid are next added to the reaction mixture to precipitate the solid β-(carboxymethylthio) α-N-benzoylaminopropionic acid, together with some benzoic acid formed in the reaction. The crude product obtained is dried and then esterified by suspending in absolute alcohol and passing in dry hydrogen chloride while cooling in an ice-bath. After saturation, the reaction mixture is preferably allowed to stand at room temperature for about twenty-four hours in a closed (stoppered) vessel. The alcohol and HCl are next removed by vacuum distillation, the residue taken up in ether, the ether solution washed with aqueous sodium carbonate to remove acidic material, and the ether solution dried over anhydrous sodium sulfate. The ether is then evaporated and the residue freed from ethyl benzoate and other volatile impurities by distilling at about 5 mm. pressure at a bath temperature below 140° C. The liquid residue remaining contains the desired ester and while it cannot be distilled without decomposition, it is suitable in its crude form for use in the cyclization to the β-keto ester described hereinafter. The product obtained by this process may be illustrated by the following formula:

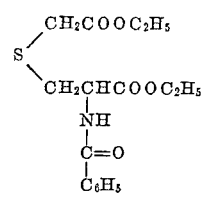

In the above reactions the use of an aromatic acyl halide is preferred. Aliphatic acid halides (e. g. acetyl chloride, butyryl bromide, etc.), however, may be used although such reactions are usually complicated by the formation of unwanted azlactones.

The β-(carbalkoxymethylthio) propionic acid esters or the α acyl amino derivatives described above, may be condensed to form carbalkoxy-3-oxo-tetrahydrothiophenes. The cyclization or intramolecular condensation may be carried out in the presence of sodium ethylate, sodium triphenyl methyl, etc., and may be illustrated by the following equation:

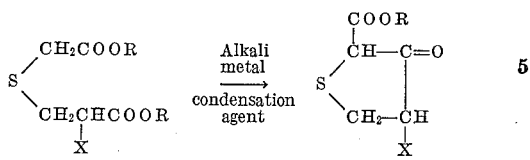

where the R's represent lower alkyl groups, and X is H or NHCOR'', where R'' is alkyl or aryl or aralkyl.

The tetrahydrothiophene compounds are of particular value for use in the synthesis of pharmaceutically active compounds such as vitamins and the like. They are described in detail in our co-pending application, Serial No. 482,206, now Patent No. 2,472,433.

It will be understood that the present invention is not limited to the above illustrative examples. All modifications of the present invention are intended to be covered by the claim annexed hereto.

We claim:

The compound, ethyl-β-(carbethoxymethylthio) α-N-benzoylaminopropionate, represented by the following formula:

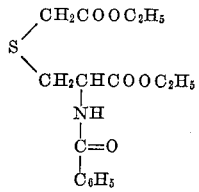

EDMOND E. MOORE.
MARJORIE B. MOORE.

REFERENCES CITED

The following references are of record in the file of this patent:

UNITED STATES PATENTS

| Number | Name | Date |
|---|---|---|
| 2,163,176 | Keyssner | June 20, 1939 |
| 2,322,273 | Biggs | June 22, 1943 |

OTHER REFERENCES

Journal of Biological Chemistry, vol. 139 (1941), pp. 407–412, 6 pp.